W. WILLERTON.
Cultivators.

No. 136,477. Patented March 4, 1873.

Witnesses:
John Becker
C. Sedgwick

Inventor:
Wm Willerton
per
Attorneys.

UNITED STATES PATENT OFFICE.

WILLIAM WILLERTON, OF JACKSONVILLE, ILLINOIS.

IMPROVEMENT IN CULTIVATORS.

Specification forming part of Letters Patent No. 136,477, dated March 4, 1873.

*To all whom it may concern:*

Figure 1:
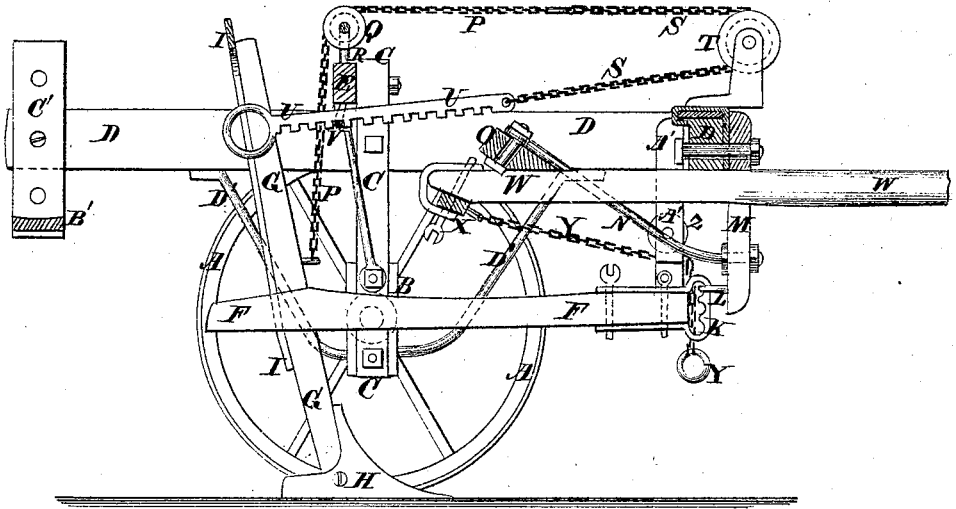
Figure 2:
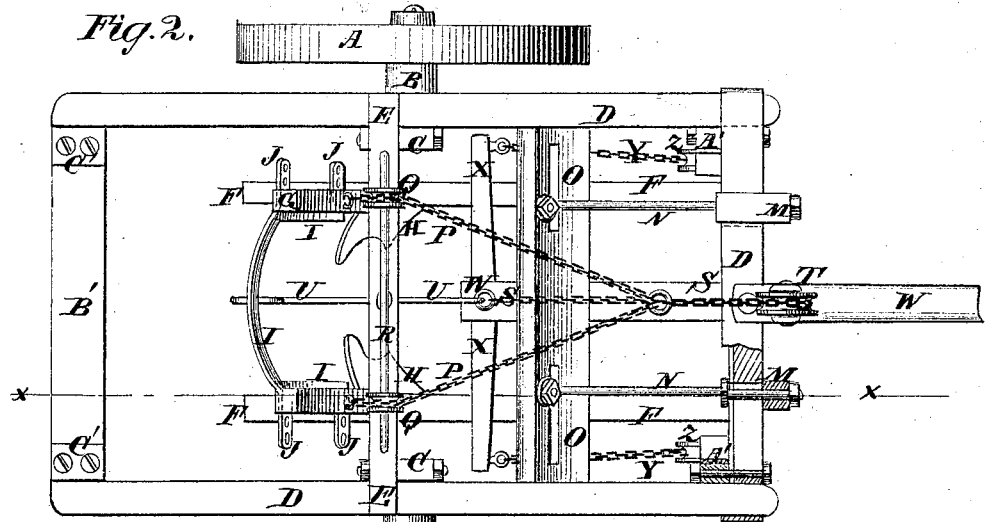
Figure 4:
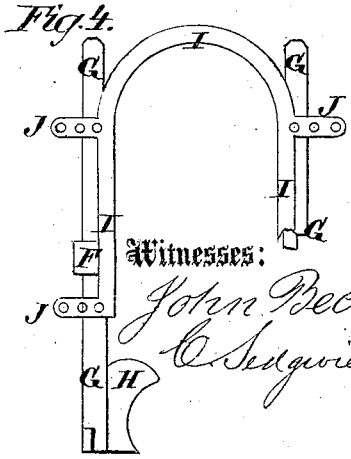
Figure 3:
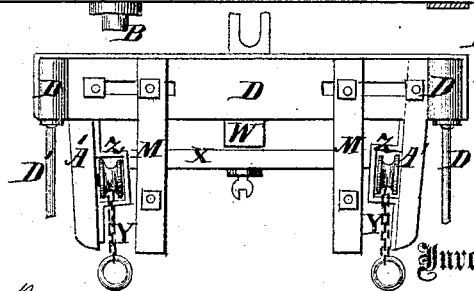

Be it known that I, WILLIAM WILLERTON, of Jacksonville, in the county of Morgan and State of Illinois, have invented a new and useful Improvement in Cultivator, of which the following is a specification:

Figure 1 is a detail vertical longitudinal section of my improved cultivator taken through the line *x x*, Fig. 2. Fig. 2 is a top view of the same, part being broken away to show the construction. Fig. 3 is a front view of the same. Fig. 4 is a detail view of the device for connecting the plows and adjusting them at different distances apart.

Similar letters of reference indicate corresponding parts.

The invention consists in the improvement of cultivators, as hereinafter fully described and pointed out in the claim.

A are the wheels, which revolve upon the journals of the short axles B, the inner ends of which are securely bolted to the outer sides of the uprights C, the upper ends of which are securely bolted to the side bars of the frame D and to the cross-bar E, which rests upon the side bars of the said frame D. F are the plow-beams, to the rear ends of which are attached the standards G, upon the lower ends of which are formed seats for the plows H, which may be of any desired kind. The plows are connected with each other and held at the proper distance apart by the bar or bow I, which is made in the shape of an inverted U, and has arms J projecting from its opposite side bars, as shown in Figs. 2 and 4. The arms J are secured to the plow-standards G by bolts, several holes being formed through the arms J to receive the said bolts, so that the plows may be readily adjusted further apart or closer together, as may be required. The forward ends of the plow-beams F have clevises K attached to them, which are connected with eyebolts or clevises L, attached to the lower ends of the uprights M. The upper ends of the uprights M are secured to the forward side of the front cross-bar of the frame D by bolts which pass through holes in the said uprights and through longitudinal slots in the said cross-bar, so that by loosening the said bolts the forward ends of the plow-beams may be adjusted at a distance apart corresponding with their rear ends.

The uprights M are strengthened against the draft strain by the inclined braces N, the forward ends of which are secured to the lower parts of the said uprights M, and their rear ends are secured to the cross-bar O by bolts which pass through holes or eyes in the ends of the said braces N and through longitudinal slots in the said cross-bar O, so that the rear ends of the braces N may be adjusted to correspond with the adjustment of the uprights M. The ends of the cross-bar O are secured to the side bars of the frame A. To the plow-beams F or standards G, near their points of intersection, are attached the lower ends of two chains, P, which pass over two pulleys, Q, placed loosely upon the long keeper R, which is connected at its ends and center with the cross-bar E, so that the pulleys Q may adjust themselves further apart or closer together, according to the distance apart of the plows, and so that the pulleys may move as the plows are moved in guiding them. At a little distance in front of the cross-bar E the forward ends of the chains P are attached to the rear end of a single chain, S, which passes around a pulley, T, pivoted to the center of the forward cross-bar of the frame D, and its other end is attached to the forward end of a notched bar, U, which passes through a keeper, V, attached to the lower side of the cross-bar E, and has a handle formed upon its rear end, so that the driver, by adjusting the notched bar U in the keeper V, can adjust the plows to work at any desired depth in the ground or raise them entirely away from the ground, as may be desired. W is the tongue, which is attached to the cross-bar O and to the forward cross-bar of the frame D. To the rear end of the tongue W is pivoted the draft-box X, to the ends of which are attached the rear ends of the draft chains Y, which pass around pulleys Z pivoted to the sides of the uprights A′, the upper ends of which are bolted to the front cross-bar of the frame D. B′ is the board that forms the driver's seat, the ends of which are secured to bars or straps C′ which project upward across the sides of the rear ends of the side bars of the frame D, to which they are securely bolted, several holes being formed in the said bars or straps C′ to receive the said bolts so that the seat can be raised and lowered as the height of the corn may require. This construction allows the driver's seat to be lowered when the corn is small so that the driver, without stopping, can remove clods or other obstructions that may be thrown upon the corn. The uprights C, to which the axles B are attached, are strengthened by the braces D', the lower ends of which are attached to the lower ends of the said uprights C, and the upper ends of which are attached to the side bars of the frame D, in front and rear of said uprights C, as shown in Fig. 1.

Having thus described my invention, I claim as new and desire to secure by Letters Patent—

The combination of rack-bar U, bibranched chain P S, pulley T, laterally-sliding pulleys Q Q, and keeper V, all arranged as and for the purpose described.

WILLIAM WILLERTON.

Witnesses:
    JNO. C. POFFENBERGER,
    WILLIAM ASTELL.